United States Patent [19]

Bergmann et al.

[11] 4,339,667

[45] Jul. 13, 1982

[54] AUTOMOTIVE VEHICLE SWITCHING ELECTRIC CIRCUIT

[75] Inventors: Eduard Bergmann, Ludenscheid; Volker Speidel, Schalksmuhle, both of Fed. Rep. of Germany

[73] Assignee: Firma Leopold Kostal, Fed. Rep. of Germany

[21] Appl. No.: 253,718

[22] Filed: Apr. 13, 1981

Related U.S. Application Data

[63] Continuation of Ser. No. 64,546, Aug. 8, 1979, abandoned.

[30] Foreign Application Priority Data

Mar. 2, 1979 [DE] Fed. Rep. of Germany ....... 2908131

[51] Int. Cl.$^3$ ............................................... B60Q 1/14
[52] U.S. Cl. .................................. 307/10 LS; 315/82
[58] Field of Search .......................... 307/10 LS, 10 R; 361/196; 315/82, 83; 200/61.54

[56] References Cited

U.S. PATENT DOCUMENTS 3,748,529  7/1973  Ballou .................................. 315/83
4,131,772 12/1978  Weckenmann ................... 200/61.54

Primary Examiner—Michael L. Gellner
Assistant Examiner—James L. Dwyer
Attorney, Agent, or Firm—Jacobs & Jacobs

[57] ABSTRACT

An electrical circuit providing a light passing signal function obtained by means of a single push switch independently of whether the low beam switch is open or closed. An electronic system controlled by the push switch and the low beam switch is provided for controlling the high beam contact of the relay and when the low beam is disconnected the electronic system closes the relay contact as a function of the length of time of the closure of the push switch and when the low beam is connected the relay contact is also closed as a function of the length of time of the closure of the push switch.

16 Claims, 1 Drawing Figure

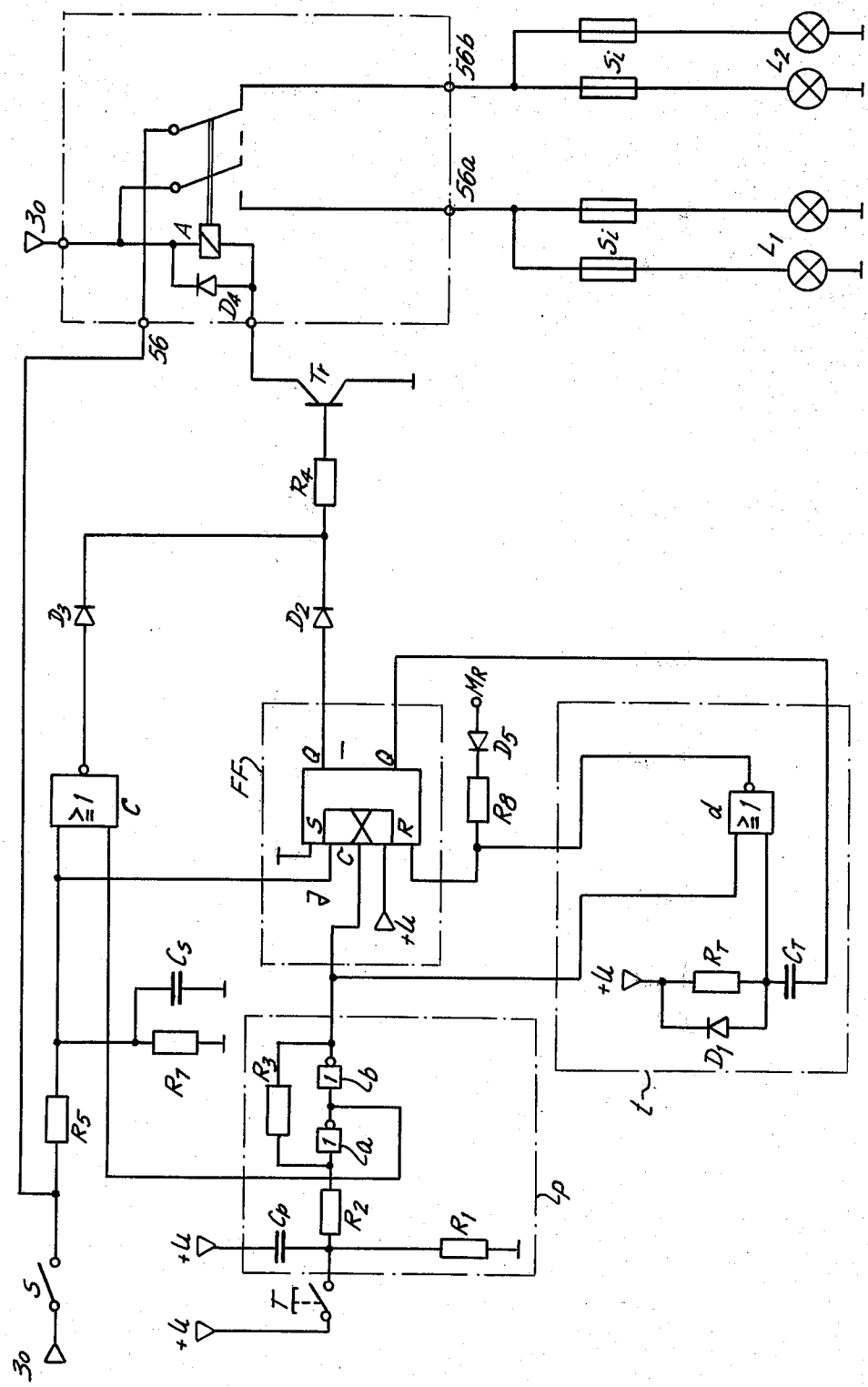

AUTOMOTIVE VEHICLE SWITCHING ELECTRIC CIRCUIT

CROSS-REFERENCE

This is a continuation, of Ser. No. 064,546 filed Aug. 8, 1979, now abandoned.

The present invention relates to an electric circuit for actuating the light passing signal and for high-beam and low-beam switching in automotive vehicles, with a push switch arranged on the steering column or the like.

This circuit is fed with DC-voltage.

Combined lock-push switches without a rear switch relay are known in the form of steering column switches for actuating light passing signal and for the switching between high beam and low beam wherein:

Light passing signal: actuating of a switch until a first pressure point is reached (push function) and Beam switching: light connected (56 at battery voltage), by actuation of the switch beyond the first pressure point (lock function).

There is also known a form of as push switch/current-pulse relay. In this case, a true light-passing signal function is only present when the light is not connected. If the low beam is connected (56 at battery voltage) a brief connecting of the high beam can be effected only by a rapid double switching of the light (low beam/high beam/low beam).

The object of the invention is to provide an electric circuit by means of which an actual light passing signal function can be obtained by means of a single push switch, regardless of whether the low beam switch is open or closed.

In order to achieve this object the invention proposes that an electronic system controlled by the push switch and the low beam switch be provided which controls the high beam contact of the relay, the electronic system, when the low beam is disconnected, closing the relay contact corresponding to the length of time of the closure of the push switch and when the low beam is connected, closing the relay contact as a function of the length of time of the closure of the push switch in case of a short duration of push only in accordance with said duration of push and, in the case of a long duration of push, leaving the relay contact closed even after the opening of the push switch (T) and only then opening the relay contact by another push switch closure.

By this circuit the object desired is achieved in principle.

The operation is as follows:

| Condition Before Push Actuation | Push Actuation Time | Reaction |
| --- | --- | --- |
| Low beam switch "OFF" | short or long | light passing signal |
| Low beam "ON" | short | light passing signal |
| Low beam "ON" | long | high beam |
| High beam "ON" | short or long | low beam |

Therefore, when the low beam is connected, a distinction between short and long actuating of the push switch and the light passing signal function is thus made possible.

In particular the invention proposes that, via the push switch, with inverted signal a NOR-member is controlled and, parallel thereto, with non-inverted signal, a bi-stable flip-flop is controlled, both outputs controlling the base of a transistor with inductive load which serves as switch, namely the headlight relay, and that via the low-beam switch the NOR-member and parallel thereto the flip-flop stage are controlled, in which connection, with the low-beam switch closed, a timer member monitors the pulse length of the push switch closure and feeds the corresponding signal to the flip-flop stage at the reset input via a NOR-member, which furthermore is controlled directly via the push switch.

One advantageous variant consists therein that the time relay consists of an integrating member and a NOR-member.

It is furthermore advantageous that the J-input of the flip-flop stage be controlled by the low-beam switch, the C-input by the push switch and the reset input by the time member, while the Q-output controls the base of the transistor and the Q-output controls the capacitor of the time member.

It may also be advantageous if, in the case of a push switch which is not free of chatter, chatter suppression in the form of a capacitor and a resistor is provided.

In order to operate with the necessary steepness on the flip-flop stage it is necessary for a Schmitt trigger with two inverters and two resistors to be connected between push switch or chatter suppression and flip-flop stage.

Since the supply voltage for the electronic system is selected lower than the battery voltage of the automobile it is advantageous for the NOR-member to be controlled via a voltage divider and a filter capacitor from the low-beam switch.

The filter capacitor removes voltage peaks present.

One illustrative embodiment of the invention will be explained below with reference to a wiring diagram.

The circuit consists of a low-beam switch S, a push switch T, a chatter suppression P, a bi-stable flip-flop FF, a timer member t, as well as a transistor Tr with inductive load, namely the relay A, which is controlled via a NOR-member c or via the flip-flop stage FF and with which the headlight bulbs $L_1$ are associated.

The low-beam switch S is connected on the one hand via terminal 30 to $+U_B$ and on the other hand directly to terminal 56 and thus connected by a relay contact 56b with the low-beam bulbs $L_2$.

When the switch S is closed, battery voltage is thus fed to the bulbs $L_2$.

Parallel to the low-beam circuit, the switch S, via a voltage divider $R_5$, $R_7$ and a filter capacitor $C_S$, controls a NOR-member c and, parallel thereto, the input J of the flip-flop FF.

The input C of the flip-flop FF is on the other hand controlled via the push switch T. In this connection, chatter suppression P with a capacitor $C_P$ and a resistor $R_1$ ($C_P$ connected to $+U_B$ and $R_1$ connected to ground) and, because of the steepness, a Schmitt trigger with two inverters a, b and two resistors $R_2$, $R_3$ are interposed.

The signal coming from the push switch T is tapped off behind the first inverter a and fed to the NOR-member c.

In front of the flip-flop FF the signal coming from the push switch T is branched off to the NOR-member d of the timer member. The NOR-member d furthermore is controlled via an integrating member $C_T$, $R_T$—the resistor of which is connected to $+U$ and its capacitor to the output Q of the flip-flop stage, a diode $D_1$ being connected in parallel to the resistor $R_T$ and in blocking direction with respect to +U, for rapid reversal of charge and preparing of the normalizing condition—, the output of the NOR-member d controlling the reset input R of the flip-flop FF.

The output Q of the flip-flop stage FF applied to direct voltage is applied via a diode $D_2$ and a resistor $R_4$ to the base of the transistor Tr, to which the output of the NOR-member c is also applied via a diode $D_3$ and the resistor $R_4$.

The emitter of the transistor Tr serving as switch is grounded while the collector is connected via relay A to $+U_B$ (terminal 30).

A diode $D_4$ is connected to the relay A in parallel and in blocking direction with respect to $+U_B$.

The flip-flop FF can furthermore also be reset via MR. (MR = logical "1"). MR is disconnected from the reset input R with respect to ground via a resistor $R_8$ and a diode $D_5$.

If, upon actuation of the light-passing-signal push button T, the low-beam switch S is not connected, the flip-flop FF cannot be set, since the J-input is logical "0". In this case, the AND conditions for logical "0" are satisfied at the OR-NOT gate c (inputs logical "0"→output logical "1") and the transistor Tr becomes conductive; the relay A attracts and switches battery voltage (30) to 56a and thus to the double-filament bulbs L1 (high beam). Upon the end of the actuation the relay A drops into the position of rest.

This process corresponds to the light passing signal function. The timer circuit t is inactive.

If the low-beam switch S is on, battery voltage is fed, via 56—relay contact—56b, to the double-filament bulbs L2 (low beam).

With the actuation of the push member T, the positive flank of the flip-flop FF is set (output A = logical "1") if it had been previously reset, or is reset (output A = logical "0") if it was previously set. If the actuation is terminated and the capacitor voltage of $C_T$ is smaller, due to the charging during the operating process, than the input threshold voltage of the OR-NOT gate d, the flip-flop FF is reset (logical "1" at the reset input R). This corresponds to a push function (light passing signal). If upon the end of the actuation the capacitor voltage at $C_T$ is greater than the input threshold voltage of the OR-NOT gate d, the flip-flop FF is not reset by logical "0" signal at R. This corresponds to a locking function.

If Q is logical "1", the high beam is connected, while if Q is logical "0", low beam is connected.

The input at the gate d of the time member t prevents the flip-flop FF from being reset during the actuation, even if the capacitor voltage at $C_T$ is below the threshold voltage of gate d. The opening of this gate takes place in any event only with open contact of the push member T by logical "0" on the input of the gate d.

What is claimed is:

1. Means for actuating and controlling a light-passing signal of an automotive vehicle and for interrelated and timed switching between high-beam and low-beam lights of the automotive vehicle road-lighting system, the said means comprising a DC-voltage-fed electric circuit interconnecting in interruptible manner the said light-passing signal and the vehicle road-lighting system, said electric circuit including a manual switch, a time responsive circuit and a closable relay contact for a. actuating the light passing signal and for b. changing the road-lighting system from high-beam to low-beam, wherein the choice of a. or b. is determined by the time responsive circuit and the length of time the manual switch is held closed.

2. Means according to claim 1, wherein the manual switch is mounted on the steering column of the vehicle or on another vehicle part accessible to the driver of the vehicle.

3. Means according to claim 1, wherein the relay contact is closed during long disconnection of the low-beam for the length of time of closure of the manual switch.

4. Means according to claim 2, wherein the relay contact is closed during short connection of the low-beam for the length of time of closure of the manual switch.

5. Means according to claim 1, wherein the relay contact is closed during long disconnection of the low-beam for the length of time of closure of the manual switch, the long disconnection resulting from an equally long switch closure and the relay contact opening again, only by a further manual switch closure.

6. Means according to claim 1, wherein the manual switch is mounted on the steering column of the vehicle or on another vehicle part accessible to the driver of the vehicle, the manual switch controlling a transistor with inductive load said inductive load being the coil of said relay and the manual switch being provided with a capacitor and resistor forming chatter suppression means therefor when the manual switch is subject to chatter.

7. Means according to claim 1, wherein the manual switch is mounted on the steering column of the vehicle or on another vehicle part accessible to the driver of the vehicle, and further comprising a separate low-beam closable switch relay contact which, when closed, acts to transmit vehicle battery voltage to lighting-system bulbs of the vehicle-lighting system.

8. A headlight high-beam/low-beam system for an automotive vehicle comprising a DC-voltage-fed electric circuit, a relay controlling both the low-beam/high-beam change and the passing signal momentary change of the head-light system, switch contact means for energizing and de-energizing the low-beam and for energizing and de-energizing the high-beam, a single touch-contact for changing low-beam to high-beam and high-beam to low-beam and for actuating the passing signal independently of the low-beam being energized or de-energized.

9. A headlight system for an automotive vehicle according to claim 8, wherein the DC-voltage-fed electric circuit with its relay controlling the low-beam, the high-beam and the passing signal of the vehicle head-lights comprising switch contact means for actuating the low-beam, touch-contact means for actuating the high-beam momentarily as a passing signal and for changing the low-beam to high-beam and the high-beam to low-beam, and electronic means controlled by said switch contact means and said touch-contact means for controlling the high-beam, the low-beam and the passing signal, whereby: (a) closing of the touchcontact means energized the high-beam passing signal during a time predetermined by the closed time of the touchcontact when the switch-contact means is opened; and whereby: (b) the closing of the touch-contact means causes a change of the energizing of the low-beam to the energizing of the high-beam for a time determined by the closed time of the touch-contact when this time is shorter than a predetermined time controlled by said electronic means, and causes a change back from the energizing of the high-beam to the energizing of the low-beam upon opening or releasing the touch-contact thus further energizing the high-beam when said closed time of the touchcontact if longer than the said predetermined time controlled by the electronic means, a further closing of the touch-contact causing the de-energizing of the high-beam and the energizing of the low-beam, all said energizing and de-energizing in (b) being only possible when the switch-contact means is closed.

10. Road-lighting system according to claim 9, wherein the said touch-contact is mounted on the steering column of the vehicle or on another part of the vehicle accessible to the driver of the vehicle.

11. Road-lighting system according to claim 9, wherein the said electronic means essentially comprises a first NOR-member, a flip-flop stage, a time-member and a transistor, one of the respective inputs of the first NOR-member and the flip-flop stage being connected to the said touch-contact in such manner that the NOR-member receives an inverted signal and that the flip-flop stage receives a non-inverted signal, the other of the respective, first NOR-member inputs is connected to the said switch-contact, the output of the NOR-member and one of the outputs of the flip-flop stage controlling the base of the transistor, which serves as a switch for the said relay, and wherein the time-member, when the said switch-contact is switched on, controls the closure of the said touch-contact and feeds a corresponding signal to a re-set input of the flip-flop stage.

12. Road-lighting system according to claim 11, wherein the time-member consists of an integrating-member and a second NOR-member controlled by the said touch-contact.

13. Road-lighting system according to claim 11, wherein the flip-flop stage has a J-input connected to the said switch-contact, a C-input connected to the said touch-contact, a R-input connected to the said time-member, a Q-output which controls the base of the said transistor and a Q-output which controls a capacitor of the said time-member.

14. Road-lighting system according to claim 9, wherein the said touch-contact is connected to means for suppressing chatter which means comprises a capacitor and a resistor.

15. Road-lighting system according to claim 14, wherein a Schmitt-trigger with two inverters and two resistors is connected between the said touch-contact or the said means of chatter suppression and the said flip-flop stage.

16. Road-lighting system according to claim 11, wherein in the connection of the said switch-contact and the said first NOR-member there is provided a voltage divider and a filter capacitor.

* * * * *